Feb. 7, 1939.  H. B. McLAUGHLIN  2,146,684
VALVE
Filed Jan. 13, 1936

INVENTOR:
Howard B. McLaughlin
BY Ray A. Erhr
ATTORNEY

Patented Feb. 7, 1939

2,146,684

UNITED STATES PATENT OFFICE 2,146,684

VALVE

Howard B. McLaughlin, Detroit, Mich., assignor to Temprite Products Corporation, Detroit, Mich., a corporation of Michigan Application January 13, 1936, Serial No. 58,839

6 Claims. (Cl. 137—153)

This invention relates to valves for controlling the flow of fluids and particularly to valve devices in which the valve proper is actuated by a diaphragm subject on one side to the pressure of the fluid controlled.

In valves of the sort referred to which have a throttling action, serious difficulties have been encountered incident to vibration of the valve proper which results in objectionable chattering and, when the valve is close to its seat, in a serious pounding of the seat with resultant deformation of the valve or seat members or of both members and consequent failure of the valve to close tightly when the valve is seated. One of the important objects of the present invention is to provide a valve of the kind in question in which these difficulties are substantially completely overcome.

Another object of the invention is to provide a valve of the character in question in which the valve proper is accurately seated initially and in operation is accurately guided in relation to its seat so as to preserve effective seating of the valve in the operation of the device.

A further object of the invention is to provide a valve of the character in question which has a maximum flow capacity for a given valve movement.

Another object of the invention is to provide a valve of the character in question which can readily be taken down for inspection and replacement of parts in case of need.

A further object of the invention is to provide a valve of the character in question which is susceptible of manufacture at moderate cost.

With the foregoing and other more or less incidental or ancillary objects in view the invention consists in structural features and combinations of parts illustrated by the preferred embodiment shown in the accompanying drawing and hereinafter described and particularly pointed out and claimed.

In the accompanying drawing.

Figure 2:
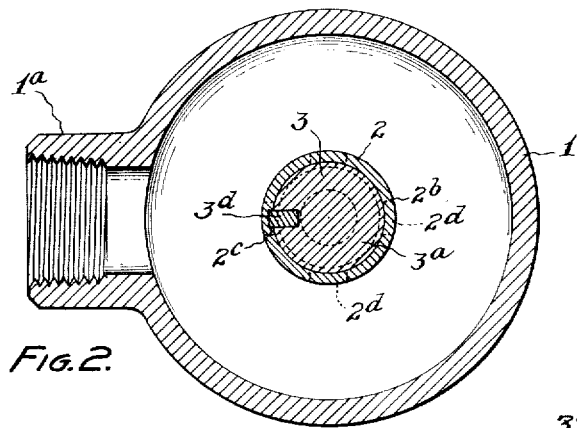
Fig. 2 is a section on the line 2—2 of Fig. 1.
Figure 3:
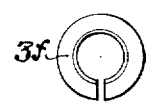
Fig. 3 is a plan view of one of the parts constituting the operative connection between the diaphragm structure and the movable valve structure.
Figure 1:
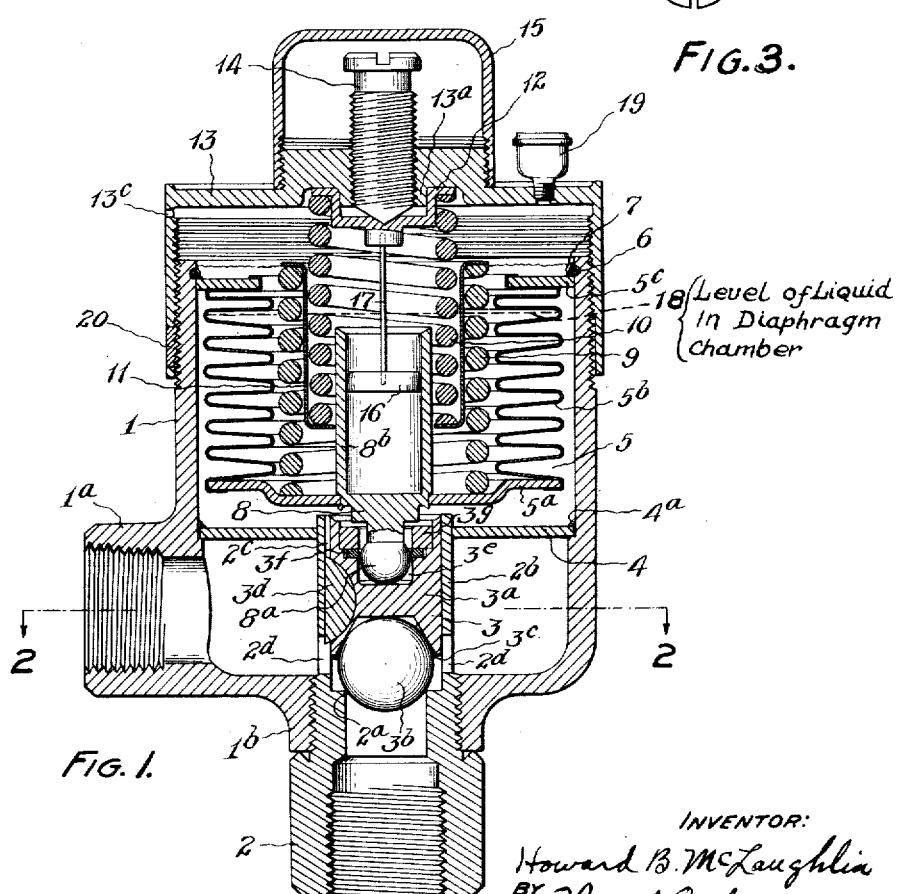
Fig. 1 is a longitudinal axial section through the entire valve mechanism.

Referring in detail to the construction illustrated, 1 designates a main casing member of cup shape formed with an internally threaded lateral inlet boss 1a and a bottom outlet boss 1b. The latter boss is internally threaded to receive a tubular valve seat and guide fitting 2. The bore of the part 2 is formed with an internal shoulder 2a constituting a valve seat. The upper tubular end of the member 2 serves as a cylindrical guide for the valve which is designated in its entirety by the numeral 3. The valve comprises an exteriorly cylindrical body portion 3a and a spherical seat-engaging portion 3b which is suitably secured, as by solder 3c, in a central recess in the lower end of the part 3a. A steel bearing ball serves well as the part 3b. The valve part 3a has a close sliding fit in the guide portion 2b of the member 2 and is held against rotation in the guide by means of a key 3d carried by the valve and slidably engaging in a key-way 2c formed in the guide. The member 2 is formed with a plurality of lateral ports 2d, 2d just above the valve seat 2a to accommodate the flow of fluid past the valve.

Within the main casing member 1 is arranged an annular partition plate 4 which has a central opening closely fitting around the valve guide 2b and which is suitably secured, as by solder 4a, upon a shoulder formed for the partition on the inner wall of the casing member 1. Thus the space above the plate 4 has only a very restricted communication with the space below it through the clearance between the guide 2b and the valve member 3a and the clearance between the guide 2b and the plate 4.

Within the space above the plate 4 is disposed a diaphragm 5 comprising a movable diaphragm plate 5a, a tubular bellows 5b which has its lower end hermetically joined to the plate 5a and an annular plate 5c which is hermetically joined to the upper end of the bellows 5b and which is in turn hermetically joined to the side wall of the casing member 1. A snap ring 6 serves as an abutment to resist upward movement of the plate 5c and the joint is suitably sealed as by solder 7. The diaphragm is operatively connected to the valve member 3a by a member 8 which is mounted in a central aperture of plate 5a and secured to the latter with a hermetically tight joint. The lower end of member 8 is formed with a ball-like projection 8a to fit somewhat loosely in a cavity or socket 3e of the valve member 3a. The ball and socket of the two parts are secured together by a resilient split ring 3f which is operatively secured in the valve member 3a by a ring 3g which engages the member 3a with a forced fit. The ring 3g engages a shoulder with which valve member 3a is formed so that there is provided for ring 3f a definite space which, without allowing any unnecessary lost motion in the axial direction, permits the split ring to expand or contract and to move bodily edgewise. The normal aperture of ring 3f is somewhat smaller than ball 8a so that the ring may by expanding be forced over the maximum diameter of the ball and then by resiliently contracting upon the ball effect an operative but readily disengageable connection. Furthermore, the connection is such as to permit limited independent angular and lateral movements in all lateral directions, as well as rotational movements, of the diaphragm structure 5 in relation to valve member 3, all without substantial axial lost motion between said parts.

Within the bellows 5b are disposed coiled springs 9 and 10 which are nested together with an interposed flanged connecting tube 11. A cup-shape cap 12 rests upon the upper end of the spring 10 and engages a depending central boss 13a of a casing closure 13 which is internally threaded to adjustably engage the upper threaded end of the main casing member 1. The closure 13 is provided with an adjustable screw 14 by means of which the tension of springs 9 and 10 can be given a limited adjustment. A removable cap 15 encloses the adjusting screw 14.

The upper portion of the member 8 carried by the diaphragm plate 5a is bored out to form a cylinder 8b in which is disposed a piston 16 which is connected by a slender and flexible rod 17 to the spring cap 12. The piston 16 has a spherical peripheral surface and this form of the piston, together with the flexibility of the rod 17, permits a rather nice fit between the piston 16 and the cylinder 8b without interfering with a certain amount of lateral movement of the cylinder incident to the functioning of the diaphragm.

Within the cup-like structure of the diaphragm A is a body of liquid 18, preferably a suitable oil. The level of this oil is substantially above the top of the cylinder 8b so that the oil may flow into the cylinder and serve as working fluid for the cylinder and piston dash-pot 8b, 16. While, as previously noted, the piston 16 has a rather nice fit in the cylinder 8b there is sufficient clearance between the two parts to permit oil to pass back and forth from one side to the other of the piston. The closure 13 is preferably provided with an oil cup 19 through which the oil 18 can conveniently be introduced into the casing.

It will be observed that the springs 9, 10 exert downward pressure on the diaphragm which is transmitted in turn to the valve to press the latter toward its seat. The spring pressure upon the valve, which supplements atmospheric pressure, can be varied through a relatively wide range by adjustment of the casing closure 13 on the main casing part 1. For some uses to which valves of this kind are put it is desirable that it be impossible to adjust the spring pressure to any large extent. I, therefore, provide the closure 13 with an aperture in which solder 20 can be run to engage the threads of the casing member 1 and thus lock the cap against turning. However, a limited adjustment of the springs 9 and 10 can readily be effected by removing the cap 15 and turning the screw 14. A small aperture 13c in the wall of closure 13 admits air to the interior of the chamber above the diaphragm.

In the assembly of my improved valve, the valve seat and guide member 2 is first operatively mounted in the main casing member 1. Then the partition plate 4 is inserted in the casing over the inner end of the guide 2b and soldered in position. By providing a small clearance between the outer edge of plate 4 and the casing it is possible to have the aperture of the plate nicely fit around the upper end of the guide part 2b of the member 2. Next the assembled diaphragm structure is inserted in the casing 1 and soldered in position. Then, the member 2 having been removed from the casing part 1, the valve 3a, 3b is inserted in the guide 2b and the part 2 reinserted in the casing 1. When this has been done, by means of a small rod or other suitable tool, sufficient pressure is applied upon the center of the upper side of the diaphragm plate 5a to force the ball 8a past the spring ring 3f and into the socket 3e of the valve. Thereupon further pressure applied in the manner stated to the upper side of the diaphragm plate 5a will cause the ball 8a to press axially against the valve and force the latter into its seat, thus initially conforming the sharp valve seat edge to the ball so as to insure a tight closure of the valve upon its seat. Thereafter the spring assembly is introduced into the diaphragm and the casing closure 13 applied so as to establish the desired spring pressure upon the valve. It will be seen that the closing pressure applied to the valve, both initially and afterwards in operation, is necessarily applied through the ball and socket connection between the diaphragm and the valve substantially on the axis of the latter and with no tendency to distort the seat of the valve In the operation of my improved valve, as, for example, in the suction line of a compressor-condenser-expander refrigerating system, fluid entering through the inlet boss 1a is stopped from flow past the valve if the latter is upon its seat. But the entering fluid is permitted to leak slowly through the restricted passages between the valve guide 2b and the valve member 3a and between said guide member and the plate 4 so that the fluid pressure gradually accumulates in the diaphragm chamber above the plate 4. When this pressure in the diaphragm chamber becomes great enough to overcome the pressure of the springs 9, 10 the valve is lifted off its seat and flow of the fluid through the valve is established. Such flow continues until the inlet pressure of the fluid entering the valve casing falls to a point permitting the springs to again close the valve. With my improved construction the gradual opening and closing movements of the valve under the control of the diaphragm and the springs is entirely free from objectionable vibration and chatter which has marked much of the operation of prior diaphragm valves known to me. With my construction rapid expanding and contracting movements of the diaphragm 5 are resisted by the marked restriction of the flow of fluid out of and into the diaphragm chamber. That is to say, the chamber on the inner side of the diaphragm and above the partition plate 4. However, I have found it difficult if not impossible to sufficiently restrict the flow of fluid into and out of the diaphragm chamber and still secure adequate freedom of movement for the valve 3. I, therefore, supplement the damping effect of the restricted flow referred to by providing the dash-pot which is interposed between the diaphragm and the casing structure. As the diaphragm expands and contracts oil is drawn into the dash-pot cylinder and expelled therefrom past the piston 16 and the substantial resistance thus afforded, combined with the resistance afforded by the restricted flow of fluid into and out of the diaphragm chamber, effectively overcomes all objectionable vibration and chatter of the diaphragm and valve. Thus there is no pounding of the valve upon its seat and an initial tight closure of the valve is maintained throughout prolonged operation. However, this result is in part due to the nice guiding of the valve in its movement from and toward the seat and such guiding, afforded by the guide 2b and key 3d, is permitted by the ball and socket connection between the diaphragm and the valve. As has been stated, the ball 8a has a somewhat loose or easy fit in the socket 3e of the valve although it is resiliently held in contact with the bottom of said socket by the spring ring 3f. Thus the ball and socket connection permits a certain amount of rotational, lateral movement and tipping of the diaphragm plate 5a so that the diaphragm, under the combined spring and fluid pressure, has adequate freedom without interfering with the guiding of the valve. As has been stated the flexibility of the piston rod 17 is adapted to permit slight lateral movement of the piston 16 and thus accommodate such movement and tipping of the diaphragm plate 5a as may occur in operation.

The fact that the connection between the diaphragm and valve permits substantially free lateral and angular movements between the connected parts has the further advantage that the valve seat and guide member need not be perfectly aligned with the lower end of the diaphragm, and this favors ease and low cost of production.

It will be observed that the fluid entering the valve casing has very free access to the space surrounding the valve guide 2b and when the valve is lifted off its seat the apertures through the said guide are adapted to accommodate a fluid flow of large volume.

The valve seat member 2 can readily be removed from the casing for inspection of the seat and the detachable ball and socket connection between the diaphragm and the valve 3 permits the latter also to be readily removed from the casing without removal of the diaphragm.

While the specific form of construction illustrated and described is such as I prefer it will be understood that there can be considerable variation in the various features of construction without departing from the invention as defined in the appended claims.

What I claim is:

1. In a valve device for controlling the flow of fluid, the combination of a casing structure having an inlet passage, an outlet passage and a valve seat disposed between said passages; a valve cooperating with the said seat to control the flow of fluid through the casing; means for guiding the movement of the valve in relation to the seat; and means for actuating the valve comprising a tubular bellows diaphragm having one end connected to the casing structure and its other end free for axial, lateral and angular movements relative to said structure and movable in one axial direction by fluid pressure thereon, a spring for moving the movable end of the diaphragm in the opposite axial direction, and an operative connection between the movable end of the diaphragm and the valve acting to hold them against relative axial movement and comprising means having mutually engaging relatively sliding surfaces formed and arranged to permit substantially free independent angular and lateral movements, in all lateral directions, of the diaphragm in relation to the valve.

2. In a valve device for controlling the flow of fluid, the combination as claimed in claim 1 in which the connection between the diaphragm and valve comprises a part that is resiliently yieldable to permit engagement and disengagement of the connection by the application to the valve of suitable force directed respectively toward or away from the diaphragm.

3. In a valve device for controlling the flow of fluid, the combination of a casing structure having an inlet passage, an outlet passage and a valve seat disposed between said passages; a valve cooperating with the said seat to control the flow of fluid through the casing; means for guiding the movement of the valve in relation to the seat; and means for actuating the valve comprising a tubular bellows diaphragm connected at one end to the casing structure with its other end free for axial, angular and lateral movements and a connection between the movable end of the diaphragm and the valve through which the diaphragm is adapted in normal operation to move the valve toward and away from the seat, said connection comprising mutually engaging ball and socket structures adapted to move relative to each other transversely of the diaphragm axis and a resilient split ring carried by the socket structure with freedom to slide edgewise, said ring being adapted by expansion to pass over the maximum diameter of the ball and yieldingly hold it in the socket.

4. In a valve device for controlling the flow of fluid, the combination of a main casing member of cup shape with an axial opening through the bottom thereof and a lateral port through the side thereof; a tubular seat and guide structure threaded into the said axial opening; a valve slidably mounted in the inner end of the seat and guide structure to cooperate with the seat; a pressure-operated diaphragm of the tubular bellows type hermetically joined at its upper end to the main casing member; a spring adapted to move the lower end of the diaphragm toward the valve seat; and an operative connection between the diaphragm and valve adapted in normal operation to transmit to the valve the movement of the diaphragm toward and from the seat, said connection comprising mutually engaging ball and socket structures adapted to move relative to each other transversely of the diaphragm axis and means for holding the ball in the socket slidably engaging the ball for universal angular motion in relation thereto and slidably engaging the socket structure for motion in any lateral direction in relation to it.

5. In a valve device for controlling the flow of fluid, the combination of a casing structure having an inlet passage, an outlet passage and a valve seat disposed between said passages; a valve cooperating with the said seat to control the flow of fluid through the casing; means for actuating the valve comprising a pressure-operated diaphragm of the tubular bellows type with its top end hermetically joined to the casing structure and its bottom end closed to form a cup-like structure; and means for damping the movement of the diaphragm and valve comprising a cylinder and piston dash-pot disposed within the said cup-like structure with one of its elements operatively connected to the diaphragm and valve and the other element operatively connected to the casing, and a body of liquid held in the cup-like structure with access to the interior of the dash-pot cylinder so that a portion of the liquid serves as the working fluid of the dash-pot while the remainder constitutes a reserve supply.

6. In a valve device for controlling the flow of fluid, the combination of a main casing member of cup shape with an axial opening through the bottom thereof and a lateral port through the side thereof; a tubular seat and guide member threaded into the said axial opening and projecting above the bottom wall of said main casing member; a valve slidably mounted in the inner end of the seat and guide member to cooperate with the seat; a pressure-operated tubular bellows diaphragm hermetically joined at its upper end to the main casing member; a spring adapted to move the other end of the diaphragm in one direction relative to the valve seat; an operative connection between the diaphragm and valve; and a separately formed annular plate-like partition between the side wall of the main casing member and the top part of the seat and guide member, said partition, with other parts of the structure, forming a diaphragm chamber having a highly restricted communication with the interior casing space which communicates with the lateral port.

HOWARD B. McLAUGHLIN.

CERTIFICATE OF CORRECTION.

Patent No. 2,146,684.  February 7, 1939.

HOWARD B. McLAUGHLIN.

It is hereby certified that error appears in the printed specification of the above numbered patent requiring correction as follows: Page 3, first column, line 15, for the word "rotational" read rotation; and that the said Letters Patent should be read with this correction therein that the same may conform to the record of the case in the Patent Office.

Signed and sealed this 28th day of March, A. D. 1939.

Henry Van Arsdale (Seal)  Acting Commissioner of Patents.

6. In a valve device for controlling the flow of fluid, the combination of a main casing member of cup shape with an axial opening through the bottom thereof and a lateral port through the side thereof; a tubular seat and guide member threaded into the said axial opening and projecting above the bottom wall of said main casing member; a valve slidably mounted in the inner end of the seat and guide member to cooperate with the seat; a pressure-operated tubular bellows diaphragm hermetically joined at its upper end to the main casing member; a spring adapted to move the other end of the diaphragm in one direction relative to the valve seat; an operative connection between the diaphragm and valve; and a separately formed annular platelike partition between the side wall of the main casing member and the top part of the seat and guide member, said partition, with other parts of the structure, forming a diaphragm chamber having a highly restricted communication with the interior casing space which communicates with the lateral port.

HOWARD B. McLAUGHLIN.

CERTIFICATE OF CORRECTION.

Patent No. 2,146,684. February 7, 1939.

HOWARD B. McLAUGHLIN.

It is hereby certified that error appears in the printed specification of the above numbered patent requiring correction as follows: Page 3, first column, line 15, for the word "rotational" read rotation; and that the said Letters Patent should be read with this correction therein that the same may conform to the record of the case in the Patent Office.

Signed and sealed this 28th day of March, A. D. 1939.

Henry Van Arsdale (Seal)

Acting Commissioner of Patents.